Figures 1, 2:
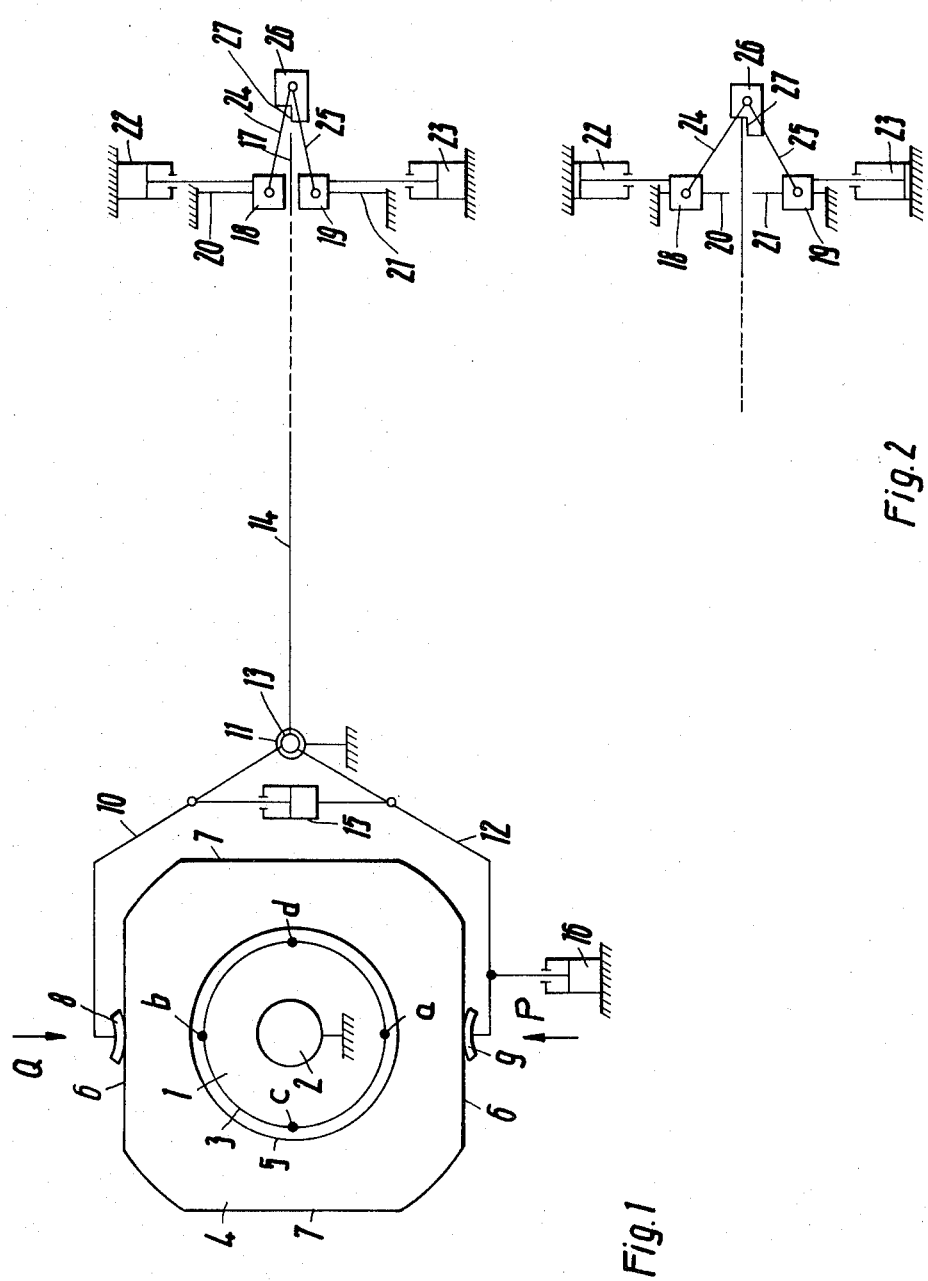

United States Patent [19]

Vind

[11] 3,716,912
[45] Feb. 20, 1973

[54] METHOD OF CENTERING THE STATOR AND ROTOR OF AN ELECTRIC MOTOR

[75] Inventor: Holger Vind, Nordborg, Denmark

[73] Assignee: Danfoss A/S, Nordborg, Denmark

[22] Filed: Jan. 4, 1971

[21] Appl. No.: 103,607

[30] Foreign Application Priority Data

Jan. 13, 1970 Germany......................P 20 01 178.3

[52] U.S. Cl. .........................29/596, 29/271, 29/598, 33/174 Q, 33/181 R, 310/42
[51] Int. Cl................................................H02k 15/00
[58] Field of Search ..........29/596, 598, 271; 310/42; 33/174 Q, 180 R, 181 R

[56] References Cited

UNITED STATES PATENTS

| 3,176,380 | 4/1965 | Wightman | 29/596 |
| 3,519,857 | 7/1970 | Plumb | 310/42 |
| 3,426,437 | 2/1969 | Rebhun et al. | 33/174 |

Primary Examiner—Richard J. Herbst
Assistant Examiner—Carl E. Hall
Attorney—Wayne B. Easton

[57] ABSTRACT

The invention relates to a method and apparatus for centering the rotor of an electric motor relative to the stator thereof to provide a circumferentially constant air gap. The stator member is fastened in a fixed position and jaws, which are mounted for pivotal movement about an external axis, are clamped externally of the stator member so that the stator member may move to two extreme positions allowed by the air gap clearance. A lever attached to the jaws indicates the two extreme positions and other apparatus is provided for determining the center position of the lever which in turn indicates a centered position for the stator relative to the rotor.

3 Claims, 2 Drawing Figures

METHOD OF CENTERING THE STATOR AND ROTOR OF AN ELECTRIC MOTOR

The invention relates to a method of centering the stator and rotor of an electric motor and to apparatus for performing the method.

When an electric motor is being assembled, the rotor and stator must be correctly centered relatively to each other. It is generally not possible to manufacture and fit together the various components in so precise a manner that an air-gap of predetermined size can be guaranteed in advance. If this can in fact be done, it is at least necessary to accept quiet large air-gaps.

In the case of built-in motors, e.g. for hermetically encased refrigerators, it is known to push resilient feelers into the air-gap between the stator and the rotor, and to locate the rotor and stator on these feelers so as to position them correctly relatively to each other by, for example, screwing the stack of stator laminations on a supporting element carrying the rotor bearing. For this purpose, however, it is necessary for the air-gap to be accessible from at least one end-face. Furthermore, the air-gap must be somewhat greater than the thickness of the resilient feelers to that these can be then withdrawn. The air-gap is therefore greater than the minimum necessary for free running of the rotor. In the case of the stators of built-in motors, there arises the further problem that, as a consequence of their laminated structure, they are not mechanically stable until they are finally secured to the associated supporting element. The air-gap and the arrangement of the resilient feelers can thus be adversely affected by shifting of the individual laminations during transportation and handling.

The object of the invention is to provide a method of centering the stator and rotor that enables accurate centering to be carried out even when the air-gap is extremely small and when this gap itself is barely accessible from the outside.

According to the invention, this object is achieved by securing the first part, by displacing the second part parallel with its axis from at least two sides until the surface bounding the air-gap abut and measuring the displacement movement outside the parts, and by finally determining a centering position on the basis of the measured values, bringing the second part into this centering position and securing it there.

In this method the actual dimensions of the two parts are used as a basis. The surfaces bounding the air-gap that have to be located at a predetermined distance one from the other themselves act as measuring surfaces. The effect of all manufacturing tolerances is therefore eliminated. Since the measurement is carried out outside the air-gap, the latter does not need to be accessible at an end-face of the assembly. The rotor can be gripped by its shaft, the stator by its outside surface, for example, and they can be held fast or moved. If some force is applied during the displacement movement, laminations that move out of position can be pushed back into their correct positions.

It is particularly advantageous if the second part is first moved in one plane until it abuts at two opposite points and is then moved, in a plane offset through 90° from the first, until it again abuts at two opposite points, and the centering position is determined by half the distance of displacement in the two planes. In this way, an air-gap having very uniform dimensions can be created using only four measuring points and any displaced laminations can be rectified as to position around this gap.

In a preferred embodiment, the rotor is held fast and the stator is displaced. The outer periphery of the stator can be held in a particularly simple manner with any appropriate gripping tools.

Apparatus for performing the method of the invention is characterized by two clamping jaws which are adapted to be applied to the outside surface of the stator and, after clamping, can be jointly swung about a fixed point of rotation, and by a measuring lever which can be swung with the clamping jaws and the free end of which is used for carrying out the measurement and determining the centering position. The stator can be moved in a safe manner into the measuring position and the centering position by means of the two clamping jaws. Because of the lever transmission, the measuring lever enables measurement and adjustment to be carried out very accurately. If appropriate force is used to close the clamping jaws, they can also correct the position of the stator laminations to some extent.

Expediently, two measuring blocks, displaceable at right-angles to the lever, are associated with the end of the lever and these blocks carry, on articulated arms, a stop block for the centering position. When the measuring blocks are moved into the measuring position, the stop block is automatically brought into the associated centering position. If it is required to carry out the centering operation rapidly and, as far as possible, on an automatic basis, it is advisable to use a first force-applying means for tightening the clamping jaws, a second force-applying means for swinging the clamping jaws, a third force-applying means for displacing one of the measuring blocks and a fourth force-applying means for displacing the other measuring block.

If the stator has two pairs of planar parallel outer surfaces, and two pairs of clamping jaws that operate in positions offset through 90° are provided, centering can be carried out in a particularly simple and reliable manner.

The invention will now be described in more detail by reference to an embodiment illustrated schematically in the drawing, in which:

FIG. 1 shows a stator and rotor with the associated measuring and adjusting apparatus in the initial position, and FIG. 2 shows the measuring and adjusting apparatus in the centering position.

A rotor 1 has a shaft 2, which is held stationary, and a cylindrical peripheral surface 3. A stator 4, which is to be centered in relation to the rotor 1, has a cylindrical inner surface 5. Its outer periphery comprises two pairs of planar parallel faces 6 and 7.

The stator is held fast between two clamping jaws 8 and 9. The clamping jaw 8 has a swingable arm 10, which can be rotated about a center point of rotation 11, while the clamping jaw 9 is mounted on a swingable arm 12 which can be swung about a point of rotation 13. Connected to the swingable arm 12 is a measuring lever 14 which, together with the arm 12, swings about the point of rotation 13. A first force-applying means 15 is adapted to force the two clamping jaws 8 and 9 towards each other. A second force-applying means 16 displaces the clamping jaws 8 and 9 together with the clamped stator 4 into the particular position required.

The end 17 of the measuring lever 14 is located between two measuring blocks 18 and 19. Each of these is displaceable on a stationary rod 20 and 21 respectively and can be displaced by a force-applying means 22 and 23 respectively. Each measuring block is hinged on a stop block 26 by means of an articulated arm 24 and 25 respectively. The stop block 26 has a stop face 27.

For the purpose of carrying out the centering operation, the stator 4 is pushed over the rotor 1 and is clamped there by the clamping jaws 8 and 9 with the help of the force-applying means 15. The assembly is then swung upwards in the direction of the arrow P with the help of the force-applying means 16, until the inner surface 5 of the stator abuts the outside surface 3 of the rotor at the point $a$. The measuring lever 14 has participated in this swinging movement and its end 17 has pushed the measuring block 19 downwards. The force-applying means 23 is actuated so as to press the measuring block 19 from below firmly against the end 17 of the lever and to hold it in this position. The stator is then moved downwards in the direction of the arrow Q with the help of the force-applying means 16 until the inner surface 5 of the stator abuts the outer surface 3 of the rotor at the point $b$. As this happens, the end 17 of the lever moves upwards and displaces the measuring block 18. The force-applying means 22 presses the measuring block 18 from above against the end 17 of the lever and holds it in this position. As a result of the movement of the two measuring blocks 18 and 19, the centering block 26 is drawn to the left by the articulated arms 24 and 25 and in such manner that the stop face 27 is located exactly at the midway point between the measuring faces of the two blocks 18 and 19. The force-applying means 16 is actuated again until the end 17 of the lever bears against the stop face 27. The stator is then located precisely in a position in which the air-gap is exactly the same size in the area of the points $a$ and $b$.

If the same procedure is repeated in a plane offset through 90°, the inner surface 5 of the stator abutting the outer surface 3 of the rotor at the points $c$ and $d$, the stator finally occupies a position in which the air-gap is of more or less exactly the same size all the way round.

Both the force-applying means 15 and the force-applying means 16 are sufficiently strong to re-position displaced stator laminations with the help of the clamping jaws 8 and 9 upon abutment with the rotor 1.

Another number of abutment points e.g. three can be used instead of the two or four abutment points mentioned above. When three abutment points are used the centering position can be determined and set with precision.

I claim:

1. A method of centering the stator and rotor members of an electric motor comprising the steps of holding a first one of said members in a fixed position, moving the second one of said members into axial registration with said first member, attaching lever means externally of said second member which indicates the positions of said second member in a plane which includes the axes of both of said members, displacing said second member in said plane to both diametrically opposite extreme positions, determining a centered position for said second member based on said indicated extreme positions and securing said second member relative to said first member when said second member is in said centered position.

2. A method according to claim 1 including the steps of attaching lever means externally of said second member which indicates the positions of said second member in a second plane which is normal to said first named plane and includes the axes of both of said members, displacing said second member in said second plane to both diametrically opposite extreme positions, determining a centered position for said second member based on said indicated extreme positions and securing said second member relative to said first member.

3. A method according to claim 1 wherein said rotor is held in a fixed position.

* * * * *